Jan. 9, 1934.  B. H. JACOBSON  1,942,430
MANUFACTURE OF ACYL-BENZOIC ACID COMPOUNDS
Filed June 28, 1929
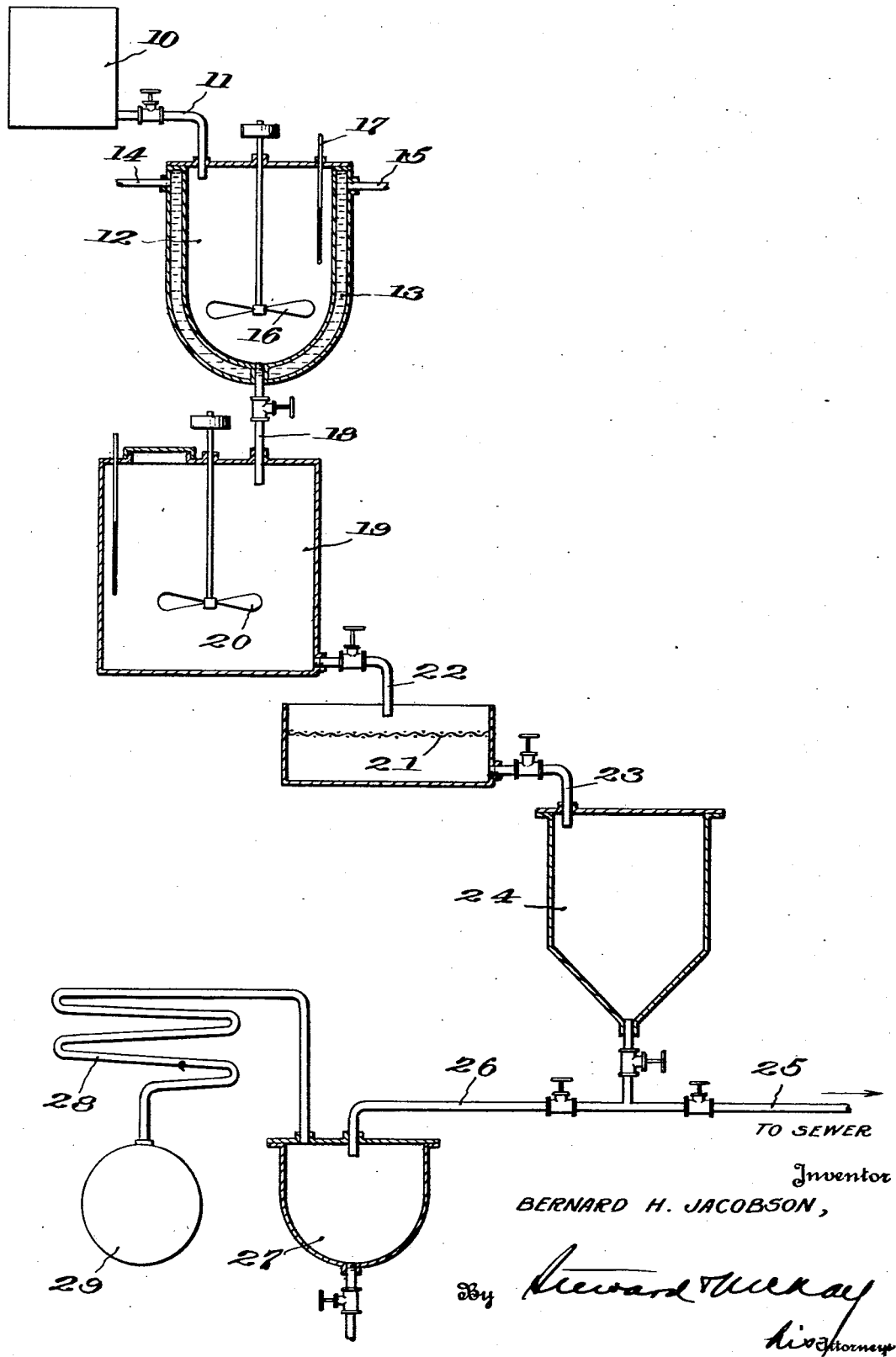
Inventor
BERNARD H. JACOBSON,
By
His Attorney Patented Jan. 9, 1934

1,942,430

UNITED STATES PATENT OFFICE 1,942,430

MANUFACTURE OF ACYL-BENZOIC ACID COMPOUNDS

Bernard H. Jacobson, Charleston, W. Va., assignor, by mesne assignments, to The Calco Chemical Company, Inc., Bound Brook, N. J., a corporation of Delaware Application June 28, 1929. Serial No. 374,474

8 Claims. (Cl. 260—64)

This invention relates to manufacture of useful aromatic compounds by the Friedel & Crafts synthesis; and it relates more particularly to processes in which dyestuff intermediates are synthetically prepared by reaction between an acyl compound and a benzenoid compound in the presence of anhydrous aluminum chloride, and a desired acyl-benzoic acid is liberated and separated, under conditions such that the desired synthesis and separation are effected in a simpler and more economical manner than has been possible heretofore.

As will appear hereinafter, the invention is broadly applicable to syntheses involving the Friedel & Crafts reaction. One of its most important practical applications at the present time, however, is in the synthetic production of intermediates of the acyl-benzoic acid type, including halogen and alkyl derivatives and substitution products; such, for example, as ortho-benzoyl-benzoic acid, para-toluyl-benzoic acid, chlor-benzoyl-benzoic acid, etc. This particular phase of the broad invention will therefore be more particularly emphasized in the following description in explaining the underlying principles involved.

In carrying out the process of the invention for the manufacture of para-toluyl-benzoic acid, for example, toluene and phthalic anhydride are caused to react in the presence of anhydrous aluminum chloride with production of the aluminum chloride compound of the phthalic-anhydride-toluene condensation product. This reaction, constituting the first step of the complete process, may be carried out in any known or suitable manner, but most desirably in the novel way to be hereinafter described. In the next step the reaction mass resulting from the first step is drowned in cold water containing a mineral acid, whereupon the aluminum chloride splits off and goes into solution in the water. By keeping the whole diluted mixture or mass sufficiently cool, very little of the para-toluyl-benzoic acid formed concurrently with the splitting off of the aluminum chloride is retained in solution by the excess of toluene present, the great bulk of the para-toluyl-benzoic acid separating out in crystalline form suspended in the toluene layer above the watery layer containing the aluminum chloride and acid. The whole mixture, still maintained cool, is then filtered to recover directly therefrom the para-toluyl-benzoic acid crystals which are then washed and dried.

In order that the principles of the invention may be still better understood, one way of carrying out the process in the manufacture of para-toluyl-benzoic acid will now be described in greater detail in connection with the drawing which illustrates more or less diagrammatically apparatus suitable for use in practicing the invention.

860 pounds of toluene is introduced from storage vessel 10 through valved pipe 11 into iron vessel 12 provided with a temperature-controlling jacket 13, which in this instance is a cooling jacket, provided with inlet and outlet pipes 14 and 15 for cooling water. Said vessel is equipped with an agitator 16 and thermometer 17. 200 pounds of anhydrous aluminum chloride is then dumped in with the agitator running. Cold water is turned into the water jacket and 100 pounds of phthalic anhydride is added slowly over a period of about 30 minutes. The liquid in the reaction vessel which originally consisted of a light yellow suspension of aluminum chloride in toluene is now a dark greenish transparent liquid. It is desirable to keep the temperature relatively low throughout the reaction. In a typical instance, where the temperature of the cooling water is 16° C., the temperature of the reaction mass can readily be kept at about 29° C., which is satisfactory. When all the phthalic anhydride has been added, the mixture is allowed to cool still further while stirring. In from about 5 to 20 minutes the whole mass will suddenly flash semi-solid, becoming faintly green in color. At this point, an additional quantity of toluene, amounting to 340 pounds, is added. The mix is now a light thin slurry.

The mix is now dropped through valved discharge pipe 18 upon a mixture of 1200 pounds of ice and 120 pounds of 20° Baumé hydrochloric acid contained in the wooden drowning tub 19, and the agitator 20 is then started. The whole operation up to this point ordinarily does not take more than 1½ hours.

In the drowning tub, the usual reaction takes place with the splitting off of the aluminum chloride and its solution in water. However, under the conditions prescribed, the whole mass being kept cool and most desirably brought down to and held at about 15° C. by addition of more ice, if necessary, the para-toluyl-benzoic acid which is formed is separated out in a very crystalline form in suspension in the excess toluene. The net effect is, therefore, one of crystallization and purification of the para-toluyl-benzoic acid.

The complex mixture in the drowning tub is next quickly filtered as a whole through appropriate filtering means, the nutsch 21 in this instance, to which it is discharged through valved pipe 22, a wool cloth being desirably used as the filtering medium. Filtering the mixture as a whole ensures recovery of any para-toluyl-benzoic acid crystals which may be present in the aqueous acid layer as well as in the toluene layer, and in addition it contributes to the convenience and economy of the plant operations especially as it facilitates the subsequent separation of the acid and toluene layers which is more difficult to accomplish properly in the presence of the crystals. The filtrate is run through valved pipe 23 to separating cone 24, while the crystals of para-toluyl-benzoic acid are retained on the filter box or nutsch. These crystals are thoroughly washed with water and dried. In a typical instance, using the specified quantities of materials and operating under the conditions set forth, the yield is 146 pounds of crystallized para-toluyl-benzoic acid or about 90 per cent of theory.

From the filtrate, after discarding the lower aqueous acid layer through valved waste outlet 25, about 1050 pounds of toluene containing in solution a small amount of para-toluyl-benzoic acid and associated impurities is run through valved pipe 26 into still 27. Upon distillation, about 1030 pounds or 98 per cent may be recovered as pure dry toluene ready for re-use, the distillation vapors passing from the still to condenser 28 and the condensate being collected in receiver 29. An impure residue of about 10 pounds remains behind in the still and can be worked up for further para-toluyl-benzoic acid recovery.

The para-toluyl-benzoic acid obtained directly from the foregoing process is of a very high degree of purity. Upon dehydration with strong sulphuric acid, it gives a high yield of methylantraquinone with a high freezing point. By the methods heretofore employed, it was impossible to obtain equally good results. The superior results obtained by the present process are believed to be due in part to what amounts in effect to crystallization of the para-toluyl-benzoic acid from its benzenoid solvent menstruum (excess of toluene), whereby impurities, possibly including tarry matter, isomers, or side-reaction products separable only by crystallization, are eliminated; and partly because of the fact that the entire operation, including both the step of initially forming the complex organic aluminum chloride compound and also the subsequent step of splitting off the aluminum chloride and recovering the crystalline para-toluyl-benzoic acid, are carried out at relatively low temperatures which for best results should not be allowed to exceed about 40° C., an operating range of from about 15° to 35° C. being usually satisfactory to effect a sufficiently rapid progress of the reactions involved.

The process is also applicable to the manufacture of other aromatic acyl-benzoic acids, such as ortho-benzoyl-benzoic acid. In this case, another benzenoid compound, namely, benzene, is used in place of toluene, the general procedure and conditions of operation being otherwise similar. In this way, it is possible to obtain pure ortho-benzoyl-benzoic acid by a method much superior to the old method of first making the crude acid and then purifying the crude by treatment with caustic soda followed by an acid precipitation.

The fact that, in the specific embodiments of the invention above described, the entire process is run cold largely eliminates the corrosion problem, which is a serious one in the methods heretofore generally employed due to the supposed necessity for heating for several hours at around 75° to 90° C. in order to complete the reaction by which the organic aluminum chlorides compound is formed. Operation at the much lower temperature of the present process also avoids the large loss of solvent (e. g. benzene or toluene). Also, in the best form of the present process, the distillation for the recovery of the excess toluene or benzene, as the case may be, is accomplished after the acid chloride solution has been separated, with the advantage that, by the addition of a small amount of an alkali to neutralize any remaining traces of acid which may be present, the distillation can be carried out in a closed steam still, the recovered benzene or toluene being ready for immediate re-use without further treatment.

While it is of distinct advantage in some cases (e. g. in making para-toluyl-benzoic acid) to run the entire process cold, as above described, it is permissible within the scope of the invention (and indeed preferable in some cases, e. g. in manufacturing chlor-benzol-benzoic acid using mono-chlor-benzene) to form the organic aluminum chloride compound in the usual manner by the ordinary "hot" method, and then to drown the resultant reaction mass in cold water and to effect separation of the acyl-benzoic acid from the drowning in the cold as above described. It is believed to be broadly new to effect such separation in the cold, irrespective of whether the organic aluminum chloride compound be prepared by the cold method or by the hot method, and the appended claims to this step alone are to be construed with corresponding breadth.

The described procedure is of course susceptible of variation in numerous respects while still utilizing in whole or in substantial part the essential underlying principles involved. For instance, cooling coils may be substituted for ice in the drowning operation. Also, considerable variation in temperature at which the condensing reaction is effected is permissible although, at temperatures as low as 10° C., the reaction rate is rather too slow for practical purposes, while 40° C. is about as high as it is desirable to go if the cold method is being employed and its benefits are to be realized in maximum degree. Variation is also permissible in the temperatures at which the subsequent operations of drowning the reaction mass and separating the acyl-benzoic acid are carried out, but here also a maximum of about 40° C. should ordinarily not be exceeded. In the drowning step, another mineral acid, such as sulfuric acid, may be used in place of hydrochloric. In the broader aspects of the invention, it is not essential that the recovery of the acyl-benzoic acid from the drowned or diluted reaction mass be effected in the specific manner hereinabove described; nor need it be effected wholly without the aid of heat. It is believed to be broadly new to cause crystallizing-out of the acyl-benzoic acid from the said drowned mass and then, while said acid is in crystal form, to perform any separating step for its recovery.

The term benzenoid compound as employed in the appended claims is to be understood as a generic designation for any aromatic hydrocarbon, or its substituted derivative, which is reactive in the Friedel & Crafts synthesis. Benzene and toluene are examples of such hydrocarbons, and mono-chlorbenzene is an example of a substituted derivative.

What is claimed is:

1. In the manufacture of an acyl-benzoic acid, the process which comprises reacting, in the presence of anhydrous aluminum chloride and at a reaction temperature not substantially exceeding 40° C. between phthalic anhydride and an excess of a liquid benzenoid compound reactive under such conditions, drowning the resultant reaction mass with sufficient cool water containing a mineral acid to liberate an acyl-benzoic acid and produce a diluted mixture whose temperature is sufficiently low to prevent the excess of said benzenoid compound from holding more than a minor part of said acyl-benzoic acid in solution, and then separating undissolved acyl-benzoic acid directly from said mixture.

2. In the manufacture of an acyl-benzoic acid, the process which comprises reacting between phthalic anhydride and an excess of toluene in the presence of anhydrous aluminum chloride and at a reaction temperature not substantially exceeding 40° C., drowning the resultant reaction mass with sufficient cool water containing a mineral acid to liberate para-toluyl-benzoic acid and produce a mixture whose temperature is sufficiently low to prevent the excess of toluene from holding more than a minor part of said para-toluyl-benzoic acid in solution, and then separating undissolved para-toluyl-benzoic acid directly from said mixture.

3. In the manufacture of an aromatic acyl-benzoic acid, the process which comprises drowning with sufficient cool water containing a mineral acid the mass resulting from reaction between phthalic anhydride and an excess of a liquid benzenoid compound in the presence of anhydrous aluminum chloride to liberate an aromatic acyl-benzoic acid and produce a diluted mass whose temperature is sufficiently low to prevent the excess of said benzenoid compound from holding in solution more than a minor part of undissolved acyl-benzoic acid, and then separating said acyl-benzoic acid directly from said diluted mass as a whole without separating the watery portion from the excess of benzenoid compound.

4. In the manufacture of an aromatic acyl-benzoic acid, the process which comprises drowning with sufficient cool water containing a mineral acid the mass resulting from reaction between phthalic anhydride and an excess of toluene in the presence of anhydrous aluminum chloride to liberate para-toluyl-benzoic acid and produce a mixture whose temperature is sufficiently low to prevent the excess of toluene from holding in solution more than a minor part of undissolved para-toluyl-benzoic acid, and then separating said para-toluyl-benzoic acid directly from said mixture as a whole without separating the watery portion from the excess of toluene.

5. In the manufacture of intermediates useful in the preparation of anthraquinone dyestuffs, the process which comprises reacting, in the presence of anhydrous aluminum chloride and at a reaction temperature not substantially exceeding 40° C. between phthalic anhydride and an excess of a liquid benzenoid compound reactive under such conditions, drowning the resultant reaction mass in a cool aqueous medium, maintaining the drowning at a temperature sufficiently low to permit of crystallizing-out of resultant acyl benzoic acid, and separating the crystallized acid directly from the drowning.

6. In the manufacture of intermediates useful in the preparation of anthraquinone dyestuffs, the process which comprises reacting between phthalic anhydride and an excess of toluene in the presence of anhydrous aluminum chloride and at a reaction temperature not substantially exceeding 40° C., drowning the resultant reaction mass in an ice-acid mixture to liberate para-toluyl-benzoic acid and produce a diluted fluid mass cool enough to permit most of said para-toluyl-benzoic acid to separate from the excess toluene as crystals, and filtering said fluid mass as a whole to recover said crystals.

7. In the manufacture of an aromatic acyl-benzoic acid, the process which comprises reacting between phthalic anhydride and an excess of benzene in the presence of anhydrous aluminum chloride and at a reaction temperature not substantially exceeding 40° C., drowning the resultant reaction mass with sufficient cool water containing a mineral acid to liberate ortho-benzoyl-benzoic acid and produce a mixture whose temperature is sufficiently low to prevent the excess of benzene from holding more than a minor part of said ortho-benzoyl-benzoic acid in solution, and then separating undissolved ortho-benzoyl-benzoic acid directly from said mixture.

8. In the manufacture of an aromatic acyl-benzoic acid, the process which comprises drowning with sufficient cool water containing a mineral acid the mass resulting from reaction between phthalic anhydride and an excess of benzene in the presence of anhydrous aluminum chloride to liberate ortho-benzoyl-benzoic acid and produce a mixture whose temperature is sufficiently low to prevent the excess of benzene from holding in solution more than a minor part of said ortho-benzoyl-benzoic acid, and then separating undissolved ortho-benzoyl-benzoic acid directly from said mixture as a whole without separating the watery portion from the excess of benzene.

BERNARD H. JACOBSON.